United States Patent [19]
Krick et al.

[11] Patent Number: 5,931,930
[45] Date of Patent: Aug. 3, 1999

[54] PROCESSOR THAT INDICATES SYSTEM BUS OWNERSHIP IN AN UPGRADABLE MULTIPROCESSOR COMPUTER SYSTEM

[75] Inventors: Robert F. Krick, Beaverton; Roshan J. Fernando, Portland, both of Oreg.

[73] Assignee: Intel Corporation, Santa Clara, Calif.

[21] Appl. No.: 08/723,667

[22] Filed: Sep. 30, 1996

Related U.S. Application Data

[63] Continuation of application No. 08/267,956, Jun. 29, 1994, abandoned.

[51] Int. Cl.⁶ .............................. G06F 13/00; G06F 9/46; G06F 15/00
[52] U.S. Cl. ................................ 710/100; 710/268; 712/1
[58] Field of Search ........................... 395/500, 733–742, 395/280, 800.01

[56] References Cited

U.S. PATENT DOCUMENTS

| | | | |
|---|---|---|---|
| 3,582,810 | 6/1971 | Gillette | 331/10 |
| 3,696,338 | 10/1972 | Preiss | 340/172.5 |
| 4,143,418 | 3/1979 | Hodge et al. | 364/200 |
| 4,148,011 | 4/1979 | McLagan et al. | 95/DIG. 1 |
| 4,320,467 | 3/1982 | Glass | 395/325 |
| 4,438,490 | 3/1984 | Wilder, Jr. | 364/200 |
| 4,547,849 | 10/1985 | Louie et al. | |
| 4,611,297 | 9/1986 | Dudley et al. | 395/293 |
| 4,622,631 | 11/1986 | Frank et al. | 395/425 |
| 4,716,526 | 12/1987 | Mori et al. | |
| 4,769,771 | 9/1988 | Lippmann et al. | |
| 4,794,523 | 12/1988 | Adan et al. | 395/425 |
| 4,885,482 | 12/1989 | Sharp et al. | 307/465 |
| 4,967,346 | 10/1990 | Freidin | 395/DIG. 1 |
| 5,018,170 | 5/1991 | Wilson . | |
| 5,025,387 | 6/1991 | Frane . | |
| 5,109,329 | 4/1992 | Strelioff | 395/725 |
| 5,117,443 | 5/1992 | Shires | 375/111 |
| 5,125,088 | 6/1992 | Culley | 395/500 |
| 5,125,093 | 6/1992 | McFarland | 395/739 |
| 5,127,089 | 6/1992 | Gay et al. | 395/288 |

(List continued on next page.)

FOREIGN PATENT DOCUMENTS

| | | |
|---|---|---|
| 267613 | 5/1988 | European Pat. Off. . |
| 333318 | 9/1989 | European Pat. Off. . |
| 381448 | 8/1990 | European Pat. Off. . |
| 411806 | 2/1991 | European Pat. Off. . |
| 510241 | 10/1992 | European Pat. Off. . |
| 2264375 | 8/1993 | United Kingdom . |

OTHER PUBLICATIONS

IBM Technical disclosure bulletin "Intel 80386 or Intel P9 Delection", vol. 32, No. 4A Sep. 1989.
"Compaq System Pro Personal Computer System" Technical Reference Guide, Chap. 3, pp. 27–42.

*Primary Examiner*—Ayaz R. Sheikh
*Assistant Examiner*—Sumati Lefkowitz
*Attorney, Agent, or Firm*—Blakely, Sokoloff, Taylor & Zafman

[57] ABSTRACT

A computer system is disclosed having a processor with a type input pin that indicates whether the processor is coupled as an OEM processor a single processor or a dual processor computer system or as an upgrade processor in the dual processor computer system. The processor includes an upgrade/OEM output pin coupled to transfer an upgrade/OEM signal over a system bus if the type input pin indicates the OEM processor. The upgrade/OEM signal indicates whether the OEM processor or the upgrade processor is a bus owner of the system bus.

34 Claims, 4 Drawing Sheets

U.S. PATENT DOCUMENTS

| | | | |
|---|---|---|---|
| 5,133,064 | 7/1992 | Hotta . | |
| 5,140,680 | 8/1992 | Bert | 395/325 |
| 5,162,979 | 11/1992 | Anzelone et al. | 361/415 |
| 5,163,145 | 11/1992 | Parks | 395/500 |
| 5,168,568 | 12/1992 | Thayer et al. | 395/305 |
| 5,247,685 | 9/1993 | Landry et al. | 395/742 |
| 5,261,109 | 11/1993 | Cadambi et al. | 395/725 |
| 5,278,959 | 1/1994 | Corcoran et al. | 395/290 |
| 5,297,272 | 3/1994 | Lu et al. | 395/500 |
| 5,301,283 | 4/1994 | Thacker et al. | 395/325 |
| 5,319,771 | 6/1994 | Takeda | 395/550 |
| 5,319,772 | 6/1994 | Hwang | 395/550 |
| 5,335,329 | 8/1994 | Cox et al. | 395/325 |
| 5,335,335 | 8/1994 | Jackson et al. | 395/425 |
| 5,349,544 | 9/1994 | Wright et al. | 364/600 |
| 5,381,154 | 1/1995 | Guerci | 342/90 |
| 5,381,543 | 1/1995 | Blomgren et al. | 395/550 |
| 5,408,611 | 4/1995 | Kim | 395/500 |
| 5,426,755 | 6/1995 | Yokouchi et al. | 395/425 |
| 5,535,395 | 7/1996 | Tipley et al. | 395/729 |
| 5,537,562 | 7/1996 | Gallup et al. | 395/581 |
| 5,537,581 | 7/1996 | Conary et al. | 395/550 |
| 5,551,012 | 8/1996 | Chuang et al. | 395/500 |
| 5,553,248 | 9/1996 | Melo et al. | 395/296 |
| 5,748,916 | 5/1998 | Conway et al. | 395/287 |

PROCESSOR THAT INDICATES SYSTEM BUS OWNERSHIP IN AN UPGRADABLE MULTIPROCESSOR COMPUTER SYSTEM

This is a continuation of application Ser. No. 08/267,956, filed Jun. 29, 1994, now abandoned.

BACKGROUND OF THE INVENTION

1. Field of the Invention

The present invention pertains to the field of computer systems. More particularly, this invention relates to a processor for an upgradable multiprocessor computer system that provides an external indication of system bus ownership.

2. Background

Prior conventional computer systems typically include a single central processing unit. Typically, such a central processing unit is coupled to a system bus that provides communication to a variety of input/output devices. In such a computer system, the central processing unit typically fetches an instruction stream from a memory subsystem over the system bus and executes each instruction in the instruction stream. Such a central processing unit typically maintains a set of data structures in the memory subsystem and performs input/output accesses to the input/output devices over the system bus.

Such a prior single processor system usually implements an interrupt mechanism for handling external hardware exceptions in the system. For example, an input/output device controller in such a system typically causes a system interrupt to the central processing unit if an access is attempted to an input/output device that is in a powered down or a suspended state. The system interrupt indicates to the central processing unit that the input/output device requires exception handling. Typically, the system interrupt directs control of the central processing unit to an interrupt routine that restores power to the powered down or suspended input/output device. Thereafter, the central processing unit reissues the input/output access to the input/output device and continues normal execution.

Other prior computer systems may provide multiple central processing units to improve instruction execution performance. Each central processing unit in such a system is typically coupled to a system bus that provides communication to a memory subsystem and a set of input/output devices. Such a multiprocessor system usually yields improved instruction execution performance in comparison to a system having a single central processing unit because the instruction execution functions are shared among multiple central processing units.

Such a multiprocessor computer system typically provides mechanisms for sharing the external memory subsystem and the input/output devices coupled to the system bus among the multiple central processing units. For example, such a prior multiprocessor system usually implements a bus arbitration mechanism that enables each central processing unit to request and obtain access to the system bus.

Such a prior multiprocessor system also usually implements an interrupt mechanism for handling hardware exceptions in the system. In such a multiprocessor system, an access over the system bus that causes an exception may originate from any of the multiple central processing units coupled to the system bus. An input/output device controller in such a system typically directs a system interrupt to the central processing unit that originated the access that caused the exception.

Typically, an input/output device controller in such a system monitors the system bus and records ownership changes of the system bus between the multiple central processing units. Such an input/output device controller accordingly directs the system interrupt to the central processing unit that owned the system bus during the access that caused the exception. Unfortunately, such a prior system requires the implementation of relatively complex external hardware in the input/output device controller to monitor system bus ownership. Such complex hardware mechanisms usually increase the cost of such prior computer systems.

In addition, such mechanisms are impractical for a computer system that is upgradable from a single processor system to a multiple processor system. In such an upgradable system, a hardware mechanism for monitoring bus ownership and directing system interrupts would not be used if only one central processing unit is installed in the system. Moreover, the addition of such hardware to the system during upgrade would require extensive hardware modification to the system.

SUMMARY AND OBJECTS OF THE INVENTION

One object of the present invention is to provide an indication of system bus ownership in an upgradable multiprocessor computer system.

Another object of the present invention is to indicate bus ownership between an OEM processor and an upgrade processor in an upgradable computer system.

Another object of the present invention is to provide a processor with an upgrade/OEM output pin that indicates bus ownership between an OEM processor and an upgrade processor in an upgradable computer system.

A further object of the present invention is provide a system wherein the OEM processor is determined by a type input pin of the processor, and wherein the OEM processor drives the upgrade/OEM signal over the system bus.

These and other objects of the invention are provided by a computer system comprising a processor having a type input pin that indicates whether the processor is coupled as an OEM processor a single processor or a dual processor computer system or as an upgrade processor in the dual processor computer system. The processor includes an upgrade/OEM output pin coupled to transfer an upgrade/OEM signal over a system bus if the type input pin indicates the OEM processor. The upgrade/OEM signal indicates whether the OEM processor or the upgrade processor is a bus owner of the system bus.

The computer system further comprises a device controller coupled to sample the upgrade/OEM signal to determine whether the OEM processor or the upgrade processor is the bus owner of the system bus. The device controller is coupled to transfer an interrupt to the OEM processor if the upgrade/OEM signal indicates that the OEM processor is the bus owner of the system bus during an access over the system bus that causes an exception. The device controller is coupled to transfer an interrupt to the upgrade processor if the upgrade/OEM signal indicates that the upgrade processor is the bus owner of the system bus during the access over the system bus that causes the exception.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
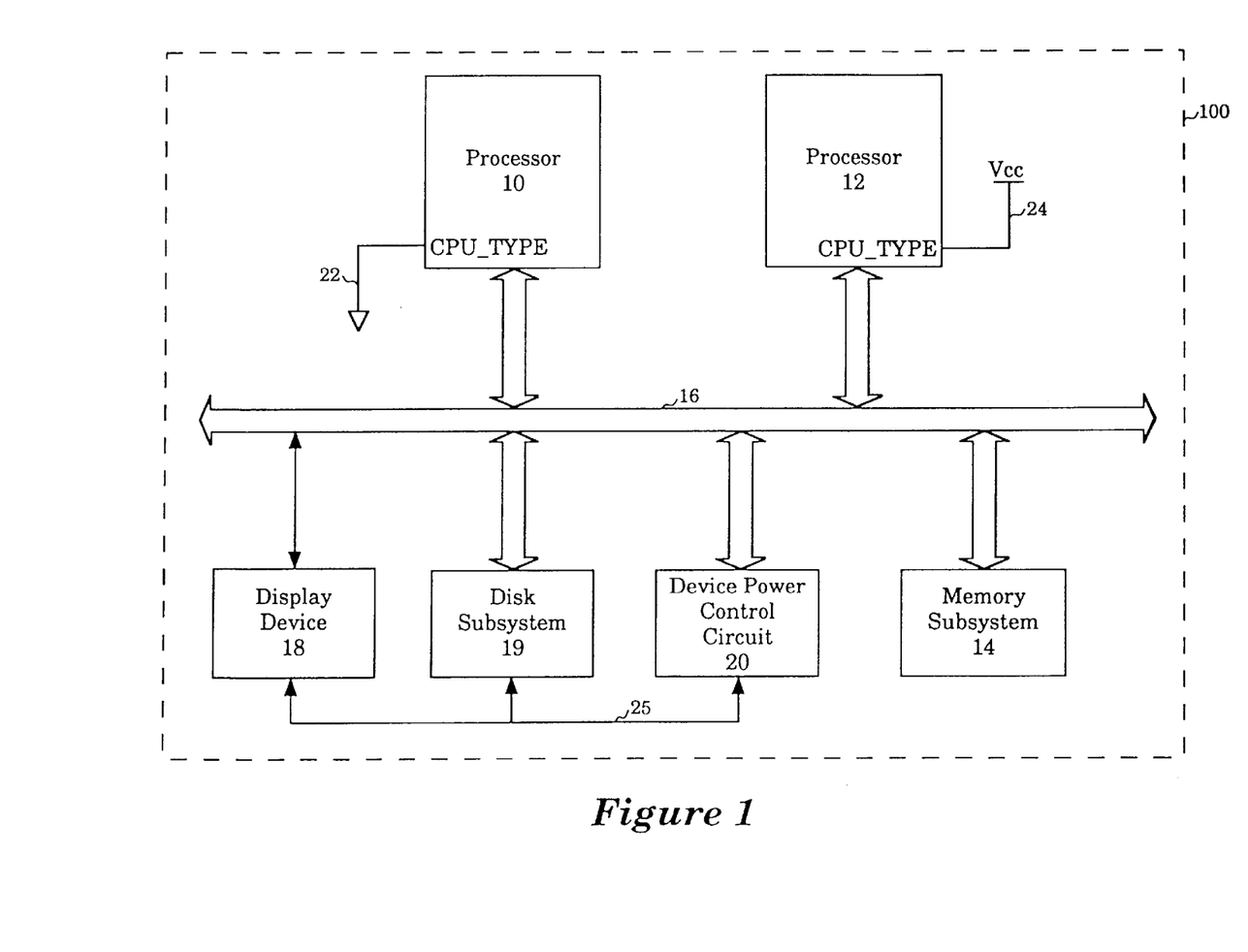
FIG. 1 illustrates a computer system for one embodiment which comprises a pair of processors, a memory subsystem, a display device, a disk subsystem, and a device power control circuit.

FIG. 1 illustrates a computer system 100 for one embodiment. The computer system 100 comprises a pair of processors 10 and 12, a memory subsystem 14, a display device 18, a disk subsystem 19, and a device power control circuit 20. The input/output devices of the computer system 100 comprise the memory subsystem 14, the display device 18, and the disk subsystem 19. The processors 10 and 12 communicate with the input/output devices of the computer system 100 over a system bus 16.

The device power control circuit 20 provides a set of power mode functions for the display device 18 and the disk subsystem 19. The device power control circuit 20 selects a power on state, a power off state, and a set of sleep mode states for the display device 18 and the disk subsystem 19 via a set of power control signals 25.

The device power control circuit 20 monitors accesses to the display device 18 and the disk subsystem 19 over the system bus 16. The accesses to the display device 18 and the disk subsystem 19 may originate from either the processor 10 or the processor 12. The device power control circuit 20 sets the disk subsystem 19 to a power off or a sleep mode state if an input/output access to the disk subsystem 19 is not detected for a predetermined time interval. The device power control circuit 20 powers down the disk subsystem 19 in order to reduce electrical current demands on a battery (not shown) for the computer system 100. The device power control circuit 20 performs a similar function for the display device 18.

The processor 10 is substantially similar to the processor 12. The processors 10 and 12 each function in either an original equipment manufacture (OEM) processor mode or an upgrade processor mode. The OEM or upgrade processor mode for each processor 10 and 12 is determined by a voltage input at a corresponding CPU_TYPE pin. A low voltage on a CPU_TYPE pin 22 of the processor 10 causes the processor 10 to function in the OEM processor mode. A high voltage level on a CPU_TYPE pin 24 of the processor 12 causes the processor 12 to function in the upgrade processor mode.

The processors 10 and 12 each contain an internal interrupt controller. The internal interrupt controllers in the processors 10 and 12 communicate receive external interrupt requests via an interrupt portion of the system bus 16. The external interrupt requests to the processors 10 and 12 include system management interrupts (SMIs). The device power control circuit 20 issues a system management interrupt over the interrupt portion of the system bus 16 to indicate that a device timeout has occurred during an access by the processor 10 or the processor 12 to an input/output device in a powered off or sleep mode state.

The processors 10 and 12 each contain an internal bus interface circuit that enables communication over the system bus 16. The internal bus interface circuits in the processors 10 and 12 implement a bus arbitration mechanism for coordinating ownership of the system bus 16. The arbitration mechanism enables each of the processors 10 and 12 to request ownership of the system bus to obtain ownership over the system bus and to thereafter relinquish control of the system bus 16.

The OEM processor 10 drives an upgrade/OEM signal over the system bus 16. The upgrade/OEM signal indicates whether the OEM processor 10 or the upgrade processor 12 is the current bus master of the system bus 16. For one embodiment, the upgrade/OEM signal on the system bus 16 is always driven by the OEM processor 10 as determined by the CPU_TYPE pin 22.

The device power control circuit 20 monitors the system bus 16 and detects input/output cycles on the system bus 16 that are targeted for the display device 18 or the disk subsystem 19. The device power control circuit 20 detects a bus time-out condition on the system bus 16 for an access to a device in a powered down or sleep mode state. The bus time-out condition is indicated if the addressed input/output device for an access does not return a ready signal over the system bus 16 within a predetermined time interval.

If a bus time-out to the display device 18 or the disk subsystem 19 is detected, then the device power control circuit 20 senses the state of the upgrade/OEM signal on the system bus 16 to determine whether the OEM processor 10 or the upgrade processor 12 initiated the input/output access that caused the bus time-out. The device power control circuit 20 accordingly directs the system management interrupt to the internal interrupt controller of the OEM processor 10 or to the internal interrupt controller of the upgrade processor 12. The OEM processor 10 or the upgrade processor 12 then executes a system management mode interrupt routine to restore the addressed input/output device to an appropriate state for subsequent access.

Figure 2:
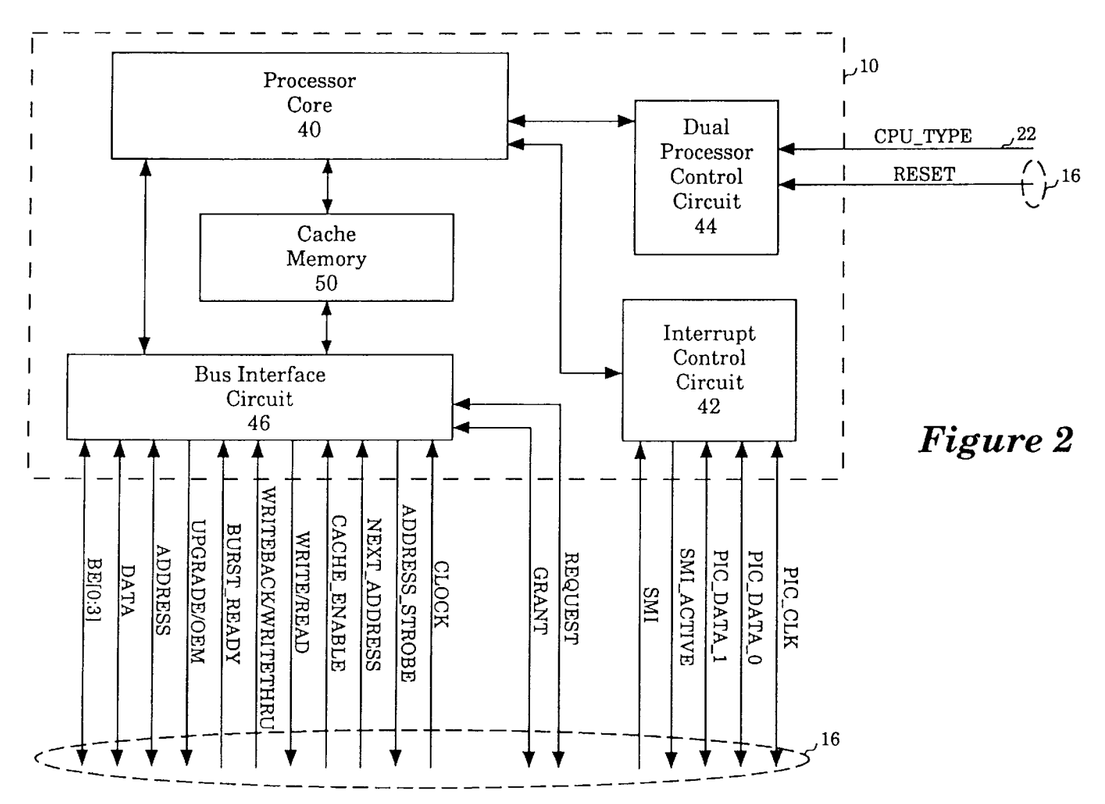
FIG. 2 illustrates a processor for one embodiment which comprises a processor core, an interrupt control circuit, a dual processor control circuit, a bus interface circuit, and a cache memory.

FIG. 2 illustrates the processor 10 for one embodiment. The processor 10 comprises a processor core 40, an interrupt control circuit 42, a dual processor control circuit 44, a bus interface circuit 46, and a cache memory 50. The processor 12 is substantially similar to the processor 10.

The processor core 40 comprises a set of instruction fetch circuitry and instruction decode circuitry for fetching instructions over the system bus 16 and for decoding the fetched instructions. The processor core 40 further comprises a set of execution units for executing the fetched instructions. For one embodiment, the processor core 40 fetches and executes instructions over the system bus 16 according to the Intel Microprocessor Architecture.

The processor 10 functions in either the OEM processor mode or the upgrade processor mode according to the state of the CPU_TYPE pin 22. The dual processor control circuit 44 samples the state of the CPU_TYPE pin 22 upon assertion of a reset (RESET) signal on the system bus 16. The dual processor control circuit 44 then sets the processor 10 into the OEM processor mode because the CPU_TYPE pin 22 is at a low voltage level.

In a similar manner, a dual processor control circuit in the processor 12 samples a high voltage state on the CPU_TYPE pin 24 and accordingly sets the processor 12 into the upgrade processor mode.

The interrupt control circuit 42 is coupled to a set of interrupt control lines of the system bus 16. The interrupt control lines of the system bus 16 include a programmable interrupt controller clock (PIC_CLK) signal, a pair of programmable interrupt controller data (PIC_DATA_0 and PIC_DATA_1) signals, and a system management interrupt active (SMI_ACTIVE) signal.

The interrupt control circuit 42 receives interrupt messages over the system bus 16 that indicate external hardware interrupts in the computer system 100. The external interrupts on the system bus 16 are targeted for either the processor 10 or the processor 12 according to a programmable interrupt controller identifier transferred over the PIC_DATA_0 and PIC_DATA_1 signals. The processor 10 and the processor 12 each maintain a unique internal programmable interrupt identifier that enables external hardware to target an interrupt message to either the processor 10 or the processor 12. System management interrupts are directed to the processors 10 and 12 via corresponding system management interrupt (SMI) pins.

The bus interface circuit 46 enables communication transactions for the processor 10 over the system bus 16. The processor 10 arbitrates for control of the system bus 16 with the processor 12 via a set of request (REQUEST) and grant (GRANT) signal lines on the system bus 16. The bus interface circuit 46 uses the request and grant signal lines on the system bus 16 to obtain control over the system bus 16 as a bus master and to relinquish control over the system bus 16 to the processor 12.

The bus interface circuit 46 is coupled to a set of address (ADDRESS) signal lines, and a set of data (DATA) signal lines on the system bus 16. The address and data signal lines of the system bus 16 enable the processor 10 to perform memory accesses and input/output accesses over the system bus 16 as well as instruction fetch cycles over the system bus 16.

The bus interface circuit 46 is also coupled to a set of byte enable (BE[0:3]) signal lines on the system bus 16. The byte enable lines indicate the valid data bytes transferred over the data signal lines of the system bus 16.

In addition, the byte enable signal lines of the system bus 16 provide a programmable interrupt controller identifier (PIC_ID) for the processors 10 and 12 during reset of the computer system 100. The bus interface circuit 46 latches the PIC_ID from the byte enable signal lines as the reset signal is asserted on the system bus 16. The PIC_ID is driven onto the byte enable signal lines of the system bus 16 at reset by the device power control circuit 20.

The processor 10 in the OEM processor mode uses the PIC_ID sampled on the byte enable signal lines at reset as the unique internal programmable interrupt identifier for the interrupt control circuit 42.

A bus interface circuit in the processor 12 in the upgrade processor mode determines a programmable interrupt identifier for the internal interrupt controller of the processor 12 by sampling the byte enable signals of the system bus 16 at reset and by inverting the least significant bit of the sampled PIC_ID from the byte enable signal lines. The upgrade processor 12 inverts the least significant bit of the PIC_ID to ensure that the OEM processor 10 and the upgrade processor 12 use different programmable interrupt controller identifiers to determine the proper target for interrupt messages transferred over the system bus 16 via the PIC_DATA_0,1 signals.

The device power control circuit 20 stores the programmable interrupt identifier for the OEM processor 10 and the upgrade processor 12 which differ only in the least significant bit. The differing programmable interrupt identifiers PIC_ID enable the device power control circuit 20 to properly direct a system management interrupt to either the OEM processor 10 or the upgrade processor 12 over the system bus 16. Alternatively, the device power control circuit 20 directs system management interrupts via separate SMI input signals to the SMI pins of the processors 10 and 12.

The bus interface circuit 46 is coupled to a clock (CLOCK) signal line for the system bus 16 as well as an address strobe (ADDRESS_STROBE) signal line, a next address (NEXT_ADDRESS) signal line and a cache enable (CACHE_ENABLE) signal line of the system bus 16. The address strobe signal indicates that a valid address is driven over the address lines of the system bus 16. The next address signal indicates whether a new address cycle is allowed on the system bus 16 and the cache enable signal line indicates whether the current data transfer cycle on the system bus 16 is cacheable to the cache memory 50.

The bus interface circuit 46 is also coupled to a WRITE/READ signal line, a WRITEBACK/WRITETHRU signal line, and a BURST_READY signal line of the system bus 16. The WRITE/READ signal of the system bus 16 indicates whether current cycle on the system bus 16 is a write or a read cycle. The WRITEBACK/WRITETHRU signal line on the system bus 16 indicates whether the current cache line transferred over the system bus 16 causes a cache line state transition to an exclusive or a shared state.

The bus interface circuit 46 always drives the UPGRADE/OEM signal line of the system bus 16. The bus interface circuit 46 drives the UPGRADE/OEM signal line to indicate whether the OEM processor 10 or the UPGRADE processor 12 is the current owner of the system bus 16 according to the bus arbitration performed via the REQUEST and the GRANT signal lines of the system bus 16.

The UPGRADE/OEM signal in conjunction with the SMI_ACTIVE signal indicates whether the processor 10 or whether the processor 12 is in a system management mode (SMM) for power management functions in the computer system 100. The SMM indication provided by the UPGRADE/OEM and SMI_ACTIVE signals is useful for hardware and software debugging in the computer system 100.

Figure 3:
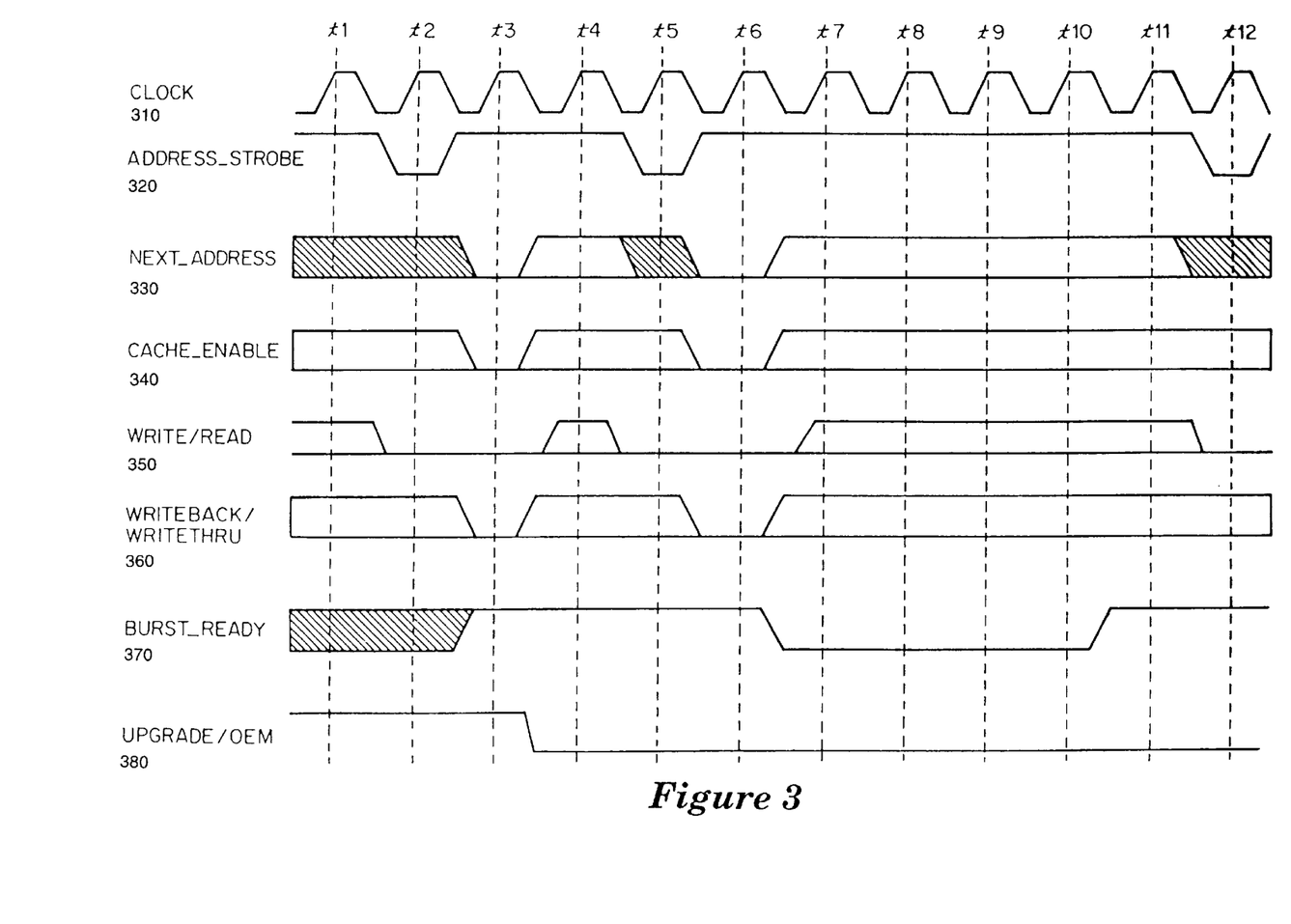
FIG. 3 shows a timing diagram that illustrates a pair of pipelined communication transactions over the system bus by the OEM and upgrade processors for one embodiment.

FIG. 3 is a timing diagram that illustrates a pair of pipelined communication transactions over the system bus 16 by the processors 10 and 12 for one embodiment.

The ADDRESS_STROBE signal line of the system bus 16 is driven by either the processor 10 or the processor 12 according to the current bus ownership of the system bus 16. The WRITE/READ signal line of the system bus 16 as well as the address, data, and byte enable signal lines of the system bus 16 are driven by either the OEM processor 10 or the upgrade processor 12 according to the current bus ownership of the system bus 16.

The CLOCK signal line of the system bus 16 is driven by external hardware in the computer system 100. The NEXT_ADDRESS, the CACHE_ENABLE, the WRITEBACK/WRITETHRU, and the BURST_READY signal lines are driven by devices coupled to the system bus 16 according to the type of communication transaction underway.

The UPGRADE/OEM signal line on the system bus 16 is always driven by the OEM processor 10. The UPGRADE/OEM signal line does not change ownership according to changes in bus ownership of the system bus 16 between the processors 10 and 12.

At time t2, the OEM processor 10 asserts the ADDRESS_STROBE signal to indicate a valid address on the address lines of the system bus 16 for a data transfer cycle initiated by the OEM processor 10. At time t5, the upgrade processor 12 asserts the ADDRESS_STROBE signal on the system bus 16 to indicate a valid address on the address lines of the system bus 16 for a data transfer cycle initiated by the upgrade processor 12.

Between times t3 and t4 the UPGRADE_OEM signal transitions from a high to low state to indicate that the OEM processor 10 is bus master during the data transfer sequence that occurs between times t6 and t10 as indicated by the BURST_READY signal line.

The device power control circuit 20 senses the state of the UPGRADE_OEM signal line on the system bus 16 to determine whether the processor 10 or the processor 12 originated the data transfer cycle between times t6 and t10 to the addressed input/output device indicated by the address signal lines of the system bus 16 during time t2.

If the addressed input/output device, either the display device 18 or the disk subsystem 19, is in a powered down or sleep mode state, then the device power control circuit 20 samples the UPGRADE/OEM signal line to determine whether to direct a system management interrupt to either the OEM processor 10 or the upgrade processor 12. The device power control circuit 20 accordingly selects the appropriate PIC_ID for the processor 10 or 12 and transfers a system management interrupt message via the PIC_DATA signal lines of the system bus 16 with the selected PIC_ID. Alternatively, the device power control circuit 20 accordingly selects either the SMI input to the processor 10 or the SMI input to the processor 12 to direct the system management interrupt.

Figure 4:
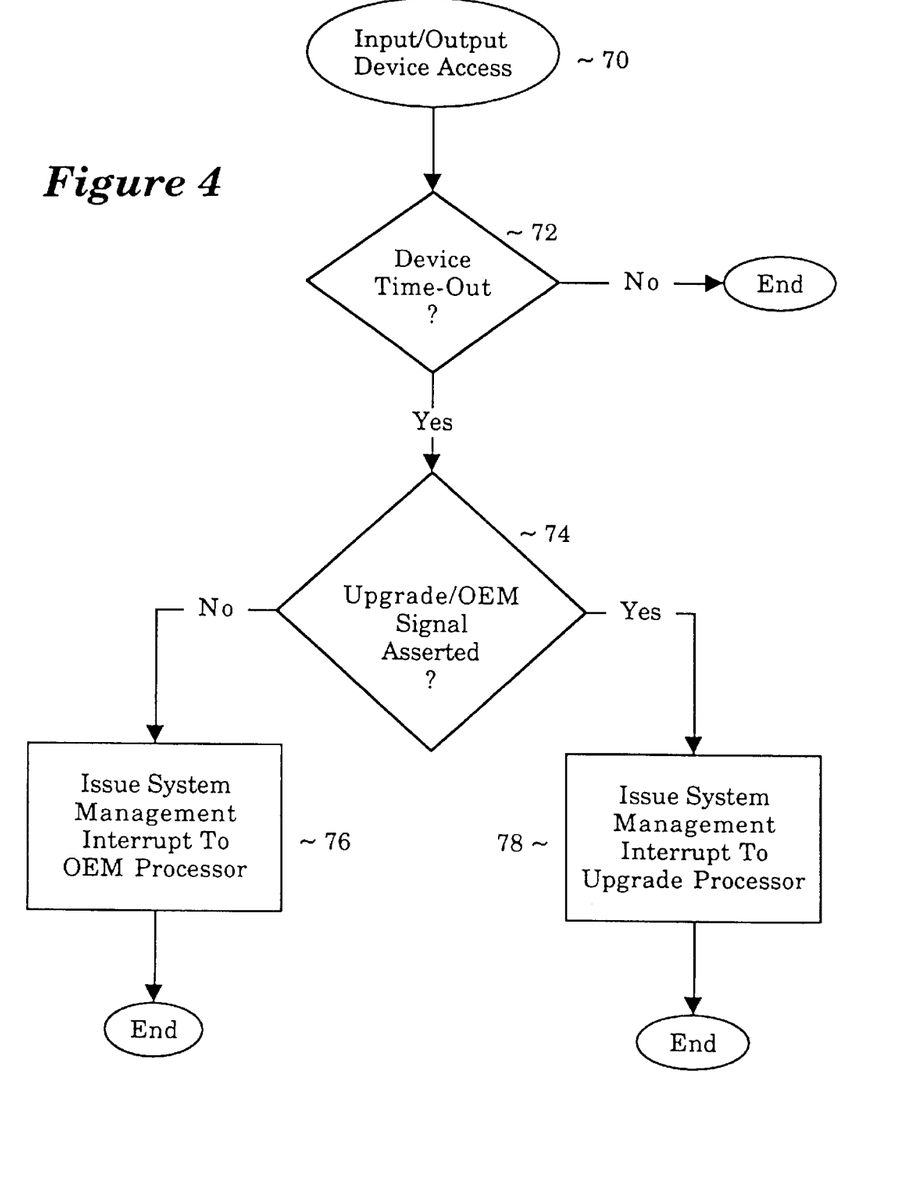
FIG. 4 shows a flow diagram that illustrates the processing of an input/output access over the system bus by the device power control circuit for one embodiment.

FIG. 4 is a flow diagram that illustrates the processing of an input/output access over the system bus 16 by the device power control circuit 20 for one embodiment. At block 70, the device power control circuit 20 senses an access over the system bus 16 to one of the input/output devices including the display device 18 and the disk subsystem 19.

Thereafter at decision block 72, if a device time-out does not occur to the addressed input/output device then the transaction over the system bus continues as normal. If a device time-out to the addressed input/output device does occur at decision block 72, then control proceeds to decision block 74.

At decision block 74, the device power control circuit 20 determines whether the UPGRADE/OEM signal on the system bus 16 is asserted. If the UPGRADE/OEM signal is asserted at decision block 74, then control proceeds to block 78.

At block 78, the device power control circuit 20 issues a system management interrupt to the upgrade processor 12. The device power control circuit 20 identifies the upgrade processor 12 as the target for the system management interrupt by transferring the PIC_ID corresponding to the upgrade processor 12 over the PIC_DATA lines during the system management interrupt message.

If the UPGRADE/OEM signal is not asserted at decision block 74, then control proceeds to block 76. At block 76, the device power control circuit 20 issues a system management interrupt to the OEM processor 10. The device power control circuit 20 identifies the OEM processor 10 as a target for the system management interrupt by transferring the PIC_ID corresponding to the OEM processor 10 over the PIC_DATA lines during the interrupt message.

The UPGRADE/OEM signal can also direct the BURST_READY signal to either the processor 10 or 12 as appropriate in a system having separate BURST_READY inputs to the processors 10 and 12.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system comprising:
   a bus;
   a plurality of processors coupled to the bus, each processor further comprising:
      a first pin for determining whether the processor is a first type processor or a second type processor;
      an output pin for transferring an output signal over the bus, the output signal driven by a first type processor, the output signal indicating whether the first type processor owns the system bus; and
   wherein the output pin is driven such that a last processor on the bus continues to own the bus.

2. The computer system of claim 1, wherein the processor further includes:
   a bus interface circuit coupled to the system bus and configured to sample an interrupt identifier from the system bus on a set of signal lines, the bus interface circuit further configured to invert a least significant bit of the interrupt identifier if the type input pin indicates that the processor is the second type processor.

3. The computer system of claim 2, wherein the set of signal lines comprise a set of byte enabled signal lines of a system bus that are configured to be sampled on a low to high transition of a reset pin of the processor.

4. The computer system of claim 2, further comprising a device controller configured to transmit the interrupt identifier over the signal lines in response to the output signal.

5. The computer system of claim 4, wherein the device controller is configured to sample the output signal to determine whether the first type processor or the second type processor owns the system bus.

6. The computer system of claim 5, wherein the device controller is configured to transfer an interrupt signal to the first type processor if the output signal indicates that the first type processor owns the system bus during an access over the system bus that requires the interrupt.

7. The computer system of claim 5, wherein the device controller is configured to transfer an interrupt signal to the second type processor if the output signal indicates that the second type processor owns the system bus during an access over the system bus that requires the interrupt.

8. A method for indicating bus ownership in an upgradeable multiprocessor computer system, comprising:
   sampling a CPU-type pin of a processor that indicates whether the processor is coupled as a first type processor or a second type processor;
   transferring an output signal from an output pin on the processor over the system bus, driven by the first type processor;

determining whether the first type processor or the second type processor owns the system bus based on the output signal; and driving the output pin such that a last processor on the system bus continues to own the bus.

9. The method of claim 8, further comprising the steps of:

sampling an interrupt identifier signal on the system bus on a set of signal lines; and modifying the interrupt identifier signal if the CPU-type pin indicates that the second type processor owns the bus.

10. The method of claim 9, wherein the signal lines include a set of byte enable signal lines of a system bus that are sampled on a low to high transition of a reset pin.

11. The method of claim 9, wherein the interrupt identifier signal is transmitted over the signal lines by a device controller in the computer system.

12. The method of claim 11, further comprising the step of sampling the output signal to determine which one of the first type processor or second type processor currently owns the system bus.

13. The method of claim 12, further comprising the step of transferring an interrupt signal to the first type processor if the output signal indicates that the first type processor owns the system bus during an access over the system bus that requires the interrupt signal.

14. The method of claim 12, further comprising the step of transferring an interrupt signal to the second type processor if the output signal indicates that the second type processor owns the system bus during an access over the system bus that requires the interrupt signal.

15. A central processing unit (CPU) comprising:

a processor core capable of generating instructions;

a dual processor control unit coupled to the processor core;

the processor including a CPU-type pin coupled to the dual processor control unit the dual processor control unit sampling a CPU-type signal indicating a processor mode;

the dual processor control unit setting the processor into a first processor mode or a second processor mode based on the CPU-type signal; and and the processor including an output pin for transferring an output signal over a system bus, the output signal indicating whether the processor in the first processor mode or the processor in the second processor mode owns the system bus; and wherein the output pin is driven such that a last processor on the system bus continues to own the system bus.

16. A CPU according to claim 15, further comprising:

an interrupt control circuit coupled to the processor core and coupled externally to a system bus and capable of controlling interrupts according to the processor mode signal generated by the processor.

17. A CPU according to claim 15, wherein the CPU-type signal is a low voltage signal to indicate a first processor mode and a high voltage signal to indicate a second processor mode.

18. A CPU according to claim 16, wherein the interrupt control circuit is capable of receiving interrupts from the system bus directed to the processor according to the processor mode.

19. A computer system comprising:

a central processing unit (CPU) capable of operating in a plurality of modes;

a system bus coupled to the CPU;

a dual processor control unit coupled to the CPU;

a CPU-type pin coupled to the CPU having a CPU-type signal indicating a mode of the CPU;

the dual processor unit sampling the CPU-type pin and setting the CPU into a first processor mode or a second processor mode based on the CPU-type signal;

an output pin for transferring an output signal over the system bus, the output signal indicating the processor mode of the processor that owns the system bus; and wherein the output pin is driven by a first type processor such that a last processor on the system bus continues to own the system bus.

20. A CPU according to claim 19, further comprising an interrupt control circuit coupled to the CPU and coupled to the system bus and capable of controlling interrupts according to the CPU-type signal.

21. A CPU according to claim 19, wherein the CPU-type signal comprises a first signal indicating a first processor mode and a second signal indicating a second processor mode, and wherein the second signal is a high voltage signal and the first signal is a low voltage signal.

22. A CPU according to claim 19, wherein the interrupt control circuit is capable of receiving interrupts from the system bus directed to the CPU according to the processor mode.

23. In a computer system having a central processing unit (CPU), a system bus coupled to the CPU, a dual processor control unit coupled to the CPU, a CPU-type pin coupled to the dual processor control unit, and an interrupt control circuit, a method of indicating bus ownership comprising:

generating a CPU-type signal indicating a type of processor mode of the CPU, wherein a first signal indicates that the CPU operates in an original equipment manufacture (OEM) processor mode and a second signal indicates that the CPU operates in an upgrade processor mode; and transferring an output signal from an output pin on a processor over the system bus, the output signal indicating whether the OEM processor or the upgrade processor owns the system bus; and driving the output pin such that a last processor on the system bus continues to own the system bus.

24. A method according to claim 23, further comprising:

if an interrupt occurs in the system, executing the interrupt according to processor mode.

25. A method according to claim 23, wherein the step of generating a CPU-type signal further comprises:

generating a low voltage signal when the CPU is operating in OEM processor mode; and generating a high voltage signal when the CPU is operating in upgrade processor mode.

26. A method according to claim 25, wherein the step of executing the interrupt further comprises controlling the interrupt according to the mode signal generated by the processor.

27. A method according to claim 23, further comprising the steps of:

sampling an interrupt identifier from the system bus on a set of signal lines; and modifying the interrupt identifier if the CPU-type input pin indicates the upgrade processor.

28. A method according to claim 23, wherein the signal lines comprise a set of byte enable signal lines of a system bus that are sampled on a low to high transition of a reset pin.

29. A method according to claim 23, wherein the interrupt identifier is transferred over the signal lines by a device controller in the computer system.

30. A method according to claim 23, further comprising the step of sampling the output signal to determine which one of the OEM processor and the upgrade processor is the current bus owner of the system bus.

31. A method according to claim 23, further comprising the step of transferring an interrupt to the OEM processor if the output signal indicates that the OEM processor is the bus owner of the system bus during an access over the system bus that requires the interrupt.

32. A method according to claim 23, further comprising the step of transferring an interrupt to the upgrade processor if the output signal indicates that the upgrade processor is the bus owner of the system bus during an access over the system bus that requires the interrupt.

33. A processor comprising:

a first pin receiving a CPU type signal, the CPU type signal causing the processor to operate in a first processor mode or a second processor mode;

an output pin for transferring an output signal, the output signal driven by the processor operating in a first processor mode, the output signal indicating whether the first type processor owns the system bus; and the output pin driven such that a last processor on a bus continues to own the bus.

34. The processor of claim 1, wherein the processor is in a first processor mode if there is only one processor in the system.

\* \* \* \* \*